United States Patent

Mitamura et al.

[15] 3,661,419
[45] May 9, 1972

[54] REAR BODY CONSTRUCTION FOR AN AUTOMOBILE

[72] Inventors: Rakuzo Mitamura, Hekikai-gun; Masatoshi Yamaya; Masakatsu Suzuki, both of Okazaki, all of Japan

[73] Assignee: Mitsubishi Jidosha Kogyo Kabushiki Kaisha, Tokyo, Japan

[22] Filed: Nov. 4, 1970

[21] Appl. No.: 86,796

[30] Foreign Application Priority Data

Dec. 9, 1969 Japan....................................44/98321

[52] U.S. Cl. ...........................296/24 R, 280/5 A, 296/28 R, 296/37 R
[51] Int. Cl. .......................................................B60r 5/04
[58] Field of Search ....................296/24 R, 28 R, 37 R, 37.2; 280/5 A

[56] References Cited

UNITED STATES PATENTS 3,014,730  12/1961  Cole.................................296/28 R X
3,047,331  7/1962  Porsche et al....................296/28 R X Primary Examiner—Robert G. Sheridan
Attorney—McGlew and Toren

[57] ABSTRACT

An automobile includes a rear body portion with a trunk space in which a fuel tank is disposed immediately behind the closure wall for the passenger compartment. The backing of the rear seat is formed by a continuation of the passenger compartment floor plate upwardly in a curve behind the seat location. The backing or end wall and the passenger compartment floor are advantageously made of a single plate thereby forming a seal of the passenger compartment in respect to the rear trunk space behind the end wall. A fuel tank is mounted within the trunk space directly behind the curved plate end-wall and it is located over a trunk floor having an opening to the exterior to provide means for dumping the gasoline outwardly below the trunk space in the event of an accident and a rupture of the gas tank. The rear portion of the body is simply formed by tack welding of the upwardly curved rear plate, forming a continuation of the passenger compartment floor at each of its sides to extension of an interior tire housing and to a shelf portion formed at the rear of the vehicle above the trunk space. The tire housing on each side is easily spot welded immediately to both sides of the backing plate and the floor plate. With the method of the invention, the floor plate with the upwardly extending protection wall formation is easily tack welded to extensions of a tire housing on each side of the vehicle to complete the interconnection of a floor assembly to a side assembly of the vehicle at the rear thereof.

12 Claims, 13 Drawing Figures

PATENTED MAY 9 1972 3,661,419
SHEET 1 OF 4
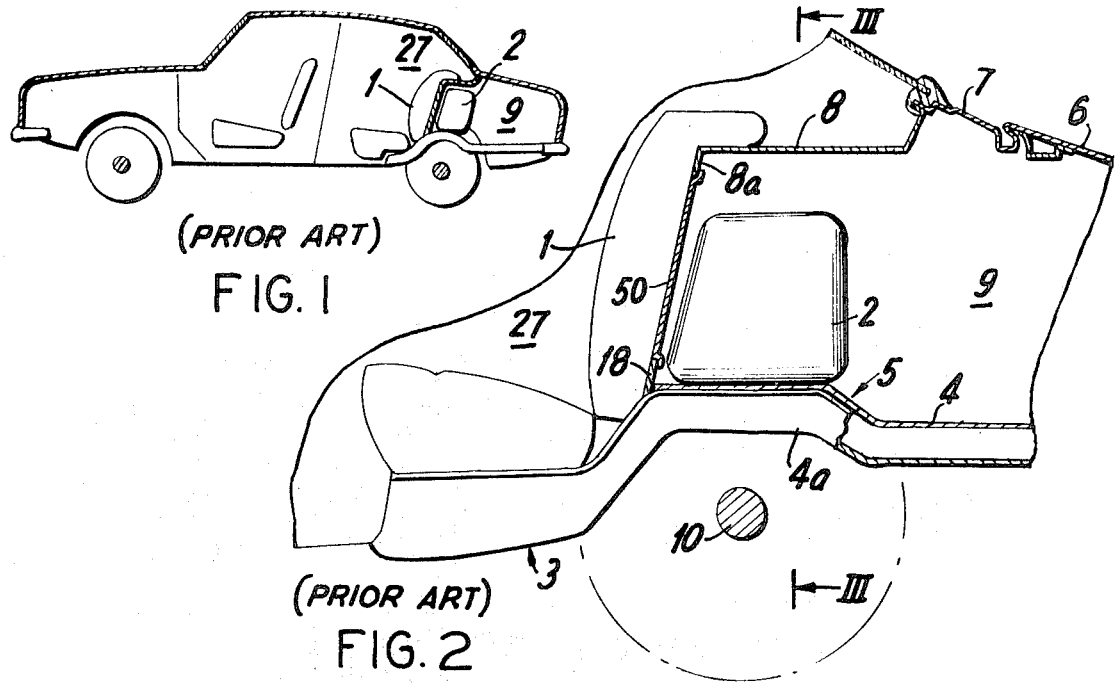
(PRIOR ART)
FIG. 1
(PRIOR ART)
FIG. 2
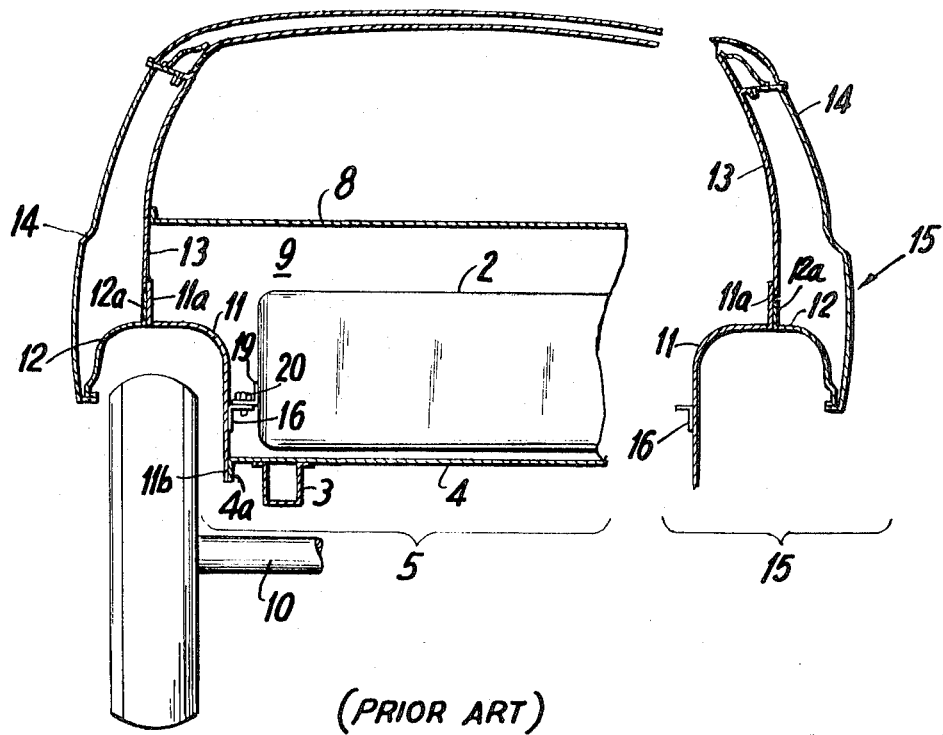
(PRIOR ART)
FIG. 3
INVENTORS
RAKUZO MITAMURA
MASATOSHI YAMAYA
BY MASAKATSU SUZUKI
McGlew & Toren
ATTORNEYS

INVENTORS
RAKUZO MITAMURA
MASATOSHI YAMAYA
BY MASAKATSU SUZUKI

McGlew & Toren
ATTORNEYS

INVENTORS
RAKUZO MITAMURA
MASATOSHI YAMAYA
BY MASAKATSU SUZUKI

*McGlew & Toren*
ATTORNEYS

REAR BODY CONSTRUCTION FOR AN AUTOMOBILE

SUMMARY OF THE INVENTION

This invention relates in general to the construction of vehicles, and, in particular, to a new and useful automobile construction with a rear body portion formed with a back wall comprising a continuation of the floor plate and providing a seal over a gas tank mounting immediately behind this wall in the trunk space, with the gas tank being located over an opening in the trunk floor plate wall to provide for a spilling of the gasoline into the opening and out of the vehicle in the event of a collision and rupturing of the tank.

Prior to the present invention, it was known to construct a passenger vehicle with a continuous floor plate which extended through the rear of the passenger compartment and into the trunk space. A separating wall was then built up over the floor plate at a location at which it extended upwardly over the rear axle. A gasoline tank was mounted on the floor plate at its highest point rearwardly of the rear seat, and a rear protection wall and at this location. The construction provided a danger for gas leakage and liquid gasoline leakage into the passenger compartment between the connection of the rear wall plate and the floor plates. In addition, the construction made it difficult to effect easy mass production assembly of the side housing of the vehicle with the floor plate assembly since the prior art arrangements required the interconnection of many individual plate elements and brackets which were both time consuming and costly. The prior art construction also had the further disadvantage that any rupture of the compartment space which may be caused by a rear end collision would be apt to produce a greater separation between the trunk space with the gas tank and the passenger space so that the danger of leakage of gasoline into the passenger space was increased.

In accordance with the present invention, there is provided a rear vehicle body construction wherein the floor plate which extends through the passenger space is curved upwardly at the end of the passenger space and forms a rear separating wall and the interior floor of the trunk is formed by an additional member connected to the rear part of this plate adjacent the floor level thereof. The trunk floor plate is provided with an opening and at a location at which the plate extends over the rear axle and where the gasoline tank is to be mounted directly behind the curved plate passenger space and trunk separating wall. Thus, any danger of rupture or leakage in respect to the gasoline tank will be lessened because the gas will either be vented or dropped immediately through the opening located directly beneath the tank in the trunk floor plate. The floor assembly may be easily connected to the floor portion extending through the passenger space and the whole floor portion extending through the passenger space, including the partition wall between the passenger space and the trunk is easily and simply welded to the side tire housing assemblies of the body. The resultant arrangement is easily to mass produce and is very safe from the operational standpoint and from the gas leakage standpoint. In addition, the passenger space is sealed from the trunk space so that there is little likelihood for the contamination of the passenger compartment with gas fumes. The construction provides a secure fastening by spot welding at both sides of the floor plate with the back wall continuation to the side housing portions for the tires so that the interior is sealed against the penetration of water or dirt. The construction is such that even if the whole trunk space is deformed and including the gas tank so that it ruptures there is no likelihood of danger of leakage of the gasoline into the passenger compartment. This is because the tank is located immediately over an opening in the floor plate portion extending into the trunk and the gasoline from this tank can spill immediately through the opening to the exterior of the vehicle, and also because the passenger compartment floor and wall plate provides substantially a permanent sealing between the trunk space and the passenger compartment.

Accordingly, it is an object of the invention to provide an improved automobile construction which includes a compartment floor plate which extends at the rear of the passenger compartment space upwardly to a shelf area which extends rearwardly over a trunk space defined behind the upwardly extending wall portion and wherein the trunk space includes a trunk floor plate connected to the lower portion of the floor plate of the passenger compartment having a mounting for a gas tank directly behind the upwardly curved portion of the compartment floor plate and with an opening therethrough for the spillage of gasoline therethrough whenever leakage is apt to occur.

A further object of the invention is to provide a rear body of an automobile which has a fuel tank disposed behind the backing of a rear seat which is formed by an upward extension of the floor plate of the passenger space, and which includes an inner tire housing on each side which is seam welded directly to the floor plate and the upward extension thereof.

A further object of the invention is to provide an automobile construction which is simple in design, rugged in construction, and economical to manufacture.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In The Drawings:

FIG. 1 is a longitudinal sectional view of an automobile constructed in accordance with the prior art;

FIG. 2 is an enlarged partial section showing the rear portion of the prior art automobile shown in FIG. 1;

FIG. 3 is a section taken on the line III—III of FIG. 2 of the prior art;

GENERAL DESCRIPTION OF THE PRIOR ART

Figure 4:
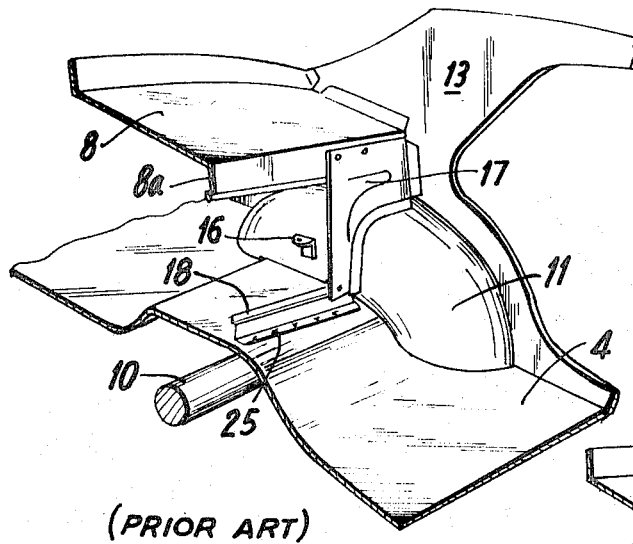
FIG. 4 is a perspective view of a portion of the rear of an automobile of the prior art.

The prior art constructions are indicated in FIGS. 1 to 8 inclusive. One example, of a structure of the conventional rear body portion of a vehicle, particularly an automobile, includes a fuel tank 2 which is disposed behind a rear seat 1 in a trunk compartment 9 as shown in FIGS. 1 to 4. The construction includes a rear frame generally designated 3 including a floor plate 4 having a raised portion 4a over a rear axle 10 and which forms together with other portions of the rear assembly a floor assembly 5 (FIGS. 2 and 3). A rear seat 1 is disposed on the floor plate 4 and the fuel tank 2 is located directly behind a rear wall 50 formed immediately behind the seat 1 on the raised portion 4a of the floor plate 4. A rear shelf plate 8 (FIG. 2) extends between a rear deck portion 7 which supports an openable trunk lid 6 and the upper end of the rear seat 1. A trunk space 9 is defined above the floor plate 4 within the closed lid 6 and it extends up to the rear plate 50. As best indicated in FIGS. 3 and 4, an inner tire housing part 11 is connected to an outer tire housing 11 is connected to an outer tire housing part 12 and these parts are interconnected by seam welding along flanges 11a and 12a. Side pillars 13 are also connected to the flange portion 11a and thereafter an outer board 14 is welded to the outside so that a side frame sub-assembly 15 is provided. A bracket 16 on the housing 11 provides means for mounting a tank 2 and a bracket 17 (FIG. 4) is provided over the housing 11 for mounting the rear shelf plate 8 which is integrally welded, previously, to the housing 11.

The floor sub-assembly 5, which is shown in FIG. 3, includes the rear frame 3 and the floor plate 4 together with the tire housing parts is united to the frame sub-assembly 15 by spot welding along a flange 4a of the floor plate 4. This spot welding is along the lower end 11b of the inner tire housing 11 and is done in the main assembling line. Since the floor plate flange 4a and the lower edge 11b of the entire housing are exposed downwardly, this spot welding may be easily achieved. A reinforcement member 18 is integrally welded along the lateral extension of the floor plate 4 previously in a step in the main assembling line and the lower portion of the bracket 17 is spot welded with this reinforcement. At the same time, the curved flange 8a of the rear shelf part 8 and the upper portion of the bracket 17 are spot welded together. In this welding operation, since the center portion of the body is open, the spot welding may be achieved.

After the vehicle is thus assembled the bracket 19, projected on both sides of the fuel tank 2, and the bracket 16, on the inner tire housing 11, are integrally connected by bolts and nuts 20 (FIG. 3).

In the prior art construction shown in FIGS. 2 to 4, the trunk room or space 9 is not completely separated from the passenger space or passenger compartment 27 so that the particles of fuel and vapors reach the passenger compartment and the passengers will be subjected to annoying fumes. In addition, the wall 50 separating the fuel tank from the passenger compartment is not very rigid and any damage to the fuel tank is apt to cause flooding of the passenger compartment.

Figure 5:
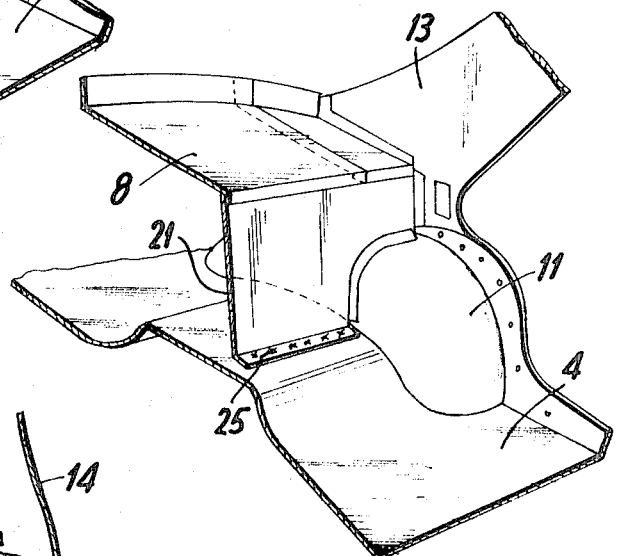
FIG. 5 is a rear perspective view of another type of prior art construction.
Figure 6:
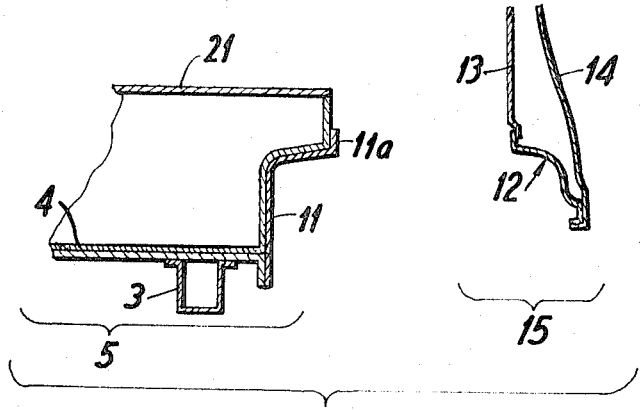
FIG. 6 is a schematic exploded transverse sectional view of a PRIOR ART automobile construction showing the manner in which the parts are assembled.

In another prior art arrangement shown in FIGS. 5 and 6, similar or substantially identical parts are similarly designated. In this arrangement, the rear shelf plate 8 and the floor plate 4 are connected by a backing plate 21 which divides the fuel tank and the trunk space from the passenger compartment. For the assembly of this type of construction the inner tire housing 11 is previously assembled to the floor assembly 5 and to the floor plate 4 and thereafter the inner tire housing 11 and the backing plate 21 are spot welded together. The frame assembly 15 formed with the outer tire housing 12, the rear pillar 13 and the outer board 14 and the floor sub-assembly 5 may be spot welded along the flange portion 11a of the inner tire housing 11. The flange portion 11a may preferably be seam welded in order to ensure that the compartment for the tire will be waterproof and dirt proof but a portable spot welding must be done since it is impossible to seam weld a large assembly unit such as that shown in the drawings.

Figure 7:
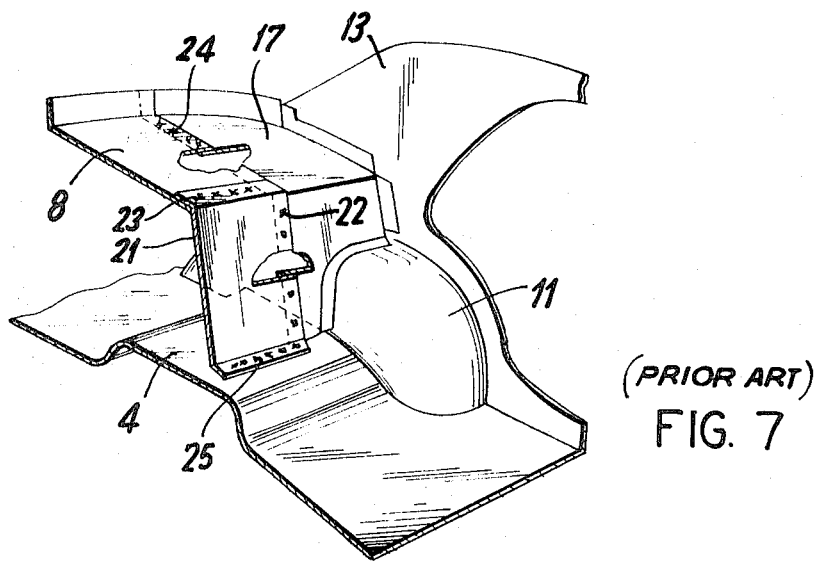
FIG. 7 is another rear perspective view of another type of construction of the prior art.

FIG. 7 shows still another prior art arrangement in which the bracket 17 is previously welded to the inner tire housing 11 and the rear pillar 13 so that the side frame self-assembly similar to the side frame self assembly 15 shown in FIGS. 2 to 4 is formed. The backing plate 21 is also previously welded to the floor plate 4 and then the bracket 17 and the backing plate 21 are spot welded at the portion 22 in the self assembly operation on a main assembly line. Thereafter, the rear shelf plate 8 is spot welded at the portions 23 and 24 to the bracket 17 and the backing plate 21. A construction of this type has disadvantages inasmuch as it does not provide a fluid and dirt proof tire housing the trunk space and the passenger compartment 27 requires a large number of welding operations in order to provide a strong enough rear assembly formation and this is costly.

Figure 8:
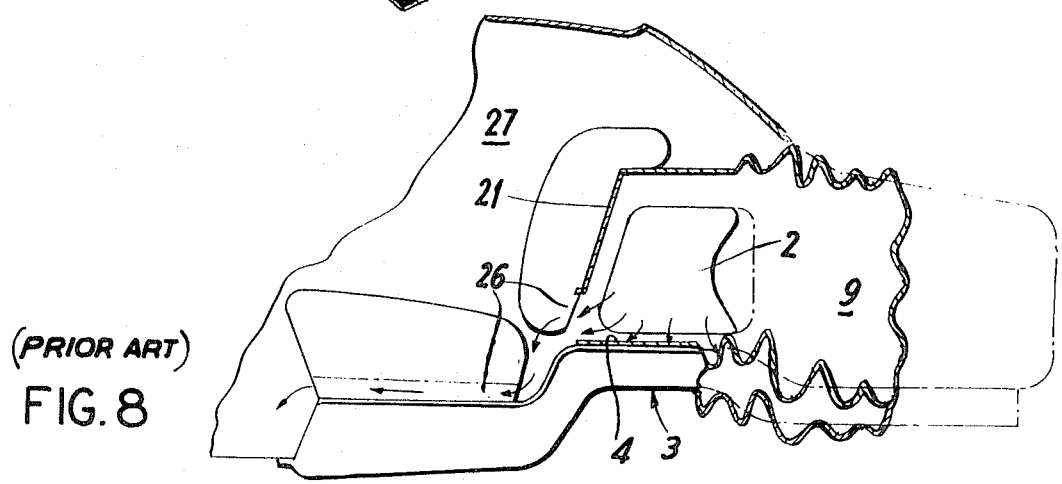
FIG. 8 is a view similar to FIG. 2 showing the rear portion of the prior art vehicle in a damaged condition for example, which may be suffered as a result of a rear end collision.
Figure 9:
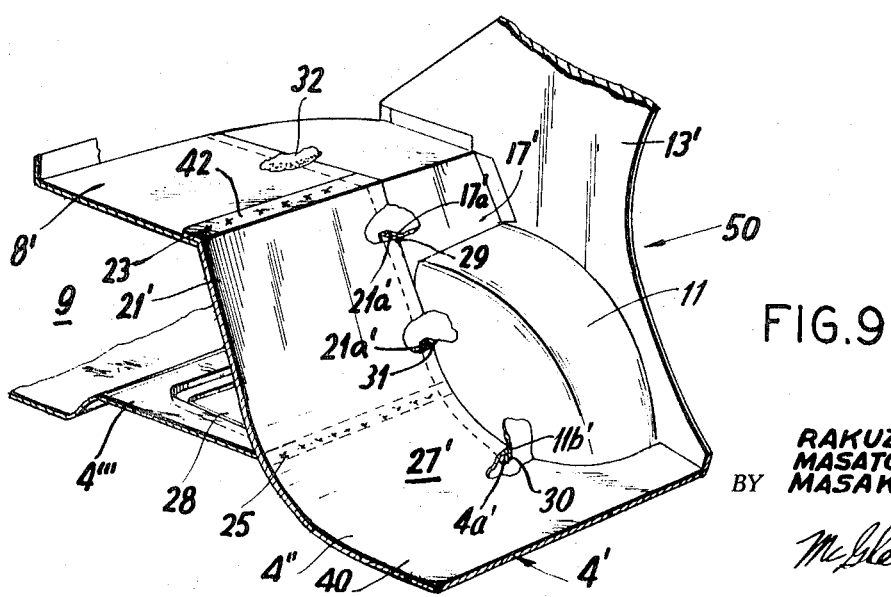
FIG. 9 is a rear perspective view of the rear portion of a vehicle constructed in accordance with the invention.
Figure 10:
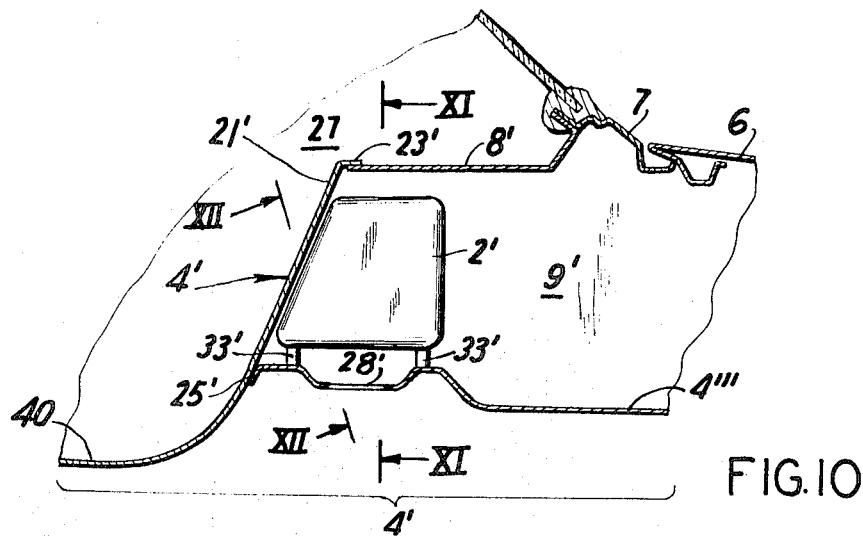
FIG. 10 is a partial longitudinal sectional view of the rear portion of a vehicle constructed in accordance with the invention.
Figure 11:
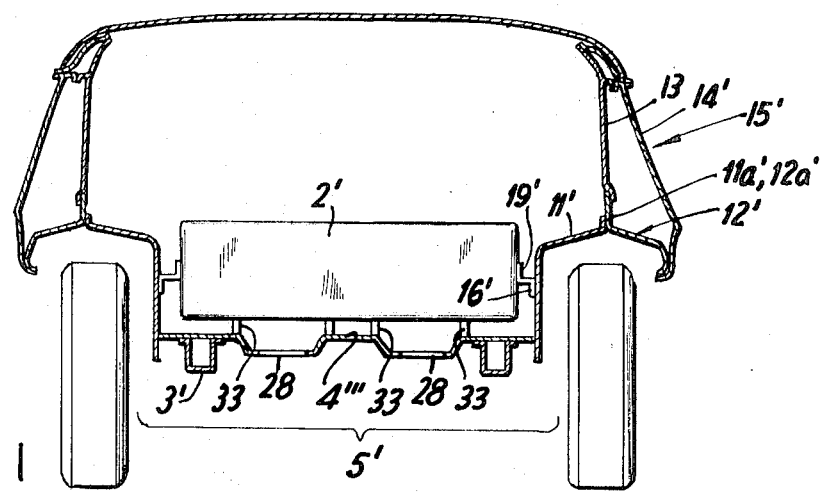
FIG. 11 is a section taken on the line XI—XI of FIG. 10.

All of the prior art is exemplified by FIGS. 1 to 7 have the following disadvantages:

When an automobile constructed with a rear body arrangement of the prior art is deformed such as by rear collision as shown in FIG. 8, the fuel tank 2 is deflected by the impact and, if it ruptures, the fuel spills out of the tank 2 as shown by the arrows and a portion of the fuel will be retained on the inner floor plate in the trunk space and another portion will flow into the passenger compartment space. This accummulation of fuel within the vehicle is very dangerous in the event of a subsequent fire. When the rear body is deformed there is a tendency for the backing plate 21 to also come off the floor plate connection so that there is a gap 26 produced between the floor plate 4 and the backing plate 21 which permits the flow of the fuel tank into the passenger space. This is true even without any rear collision and there is a tendency for the fuel in the trunk space to exude fuels which reach the passenger compartment.

GENERAL DESCRIPTION OF THE PREFERRED EMBODIMENT

The present invention is an improvement over the prior art inasmuch as it provides a construction which is simple to effect, and inexpensive, but nevertheless eliminates the disadvantages of the prior art mentioned above. The feature of the invention resides primarily in the formation of a separation plate or backing plate between the passenger compartment and the trunk space containing the fuel tank which is formed a continuation of the passenger compartment wall in the form of an upwardly curved plate, for example at the location where the floor plate normally extends upwardly to extend over the rear axle.

Referring to the drawings in particular, the invention as indicated in FIGS. 9 to 13 comprises an automobile or vehicle generally designated 50 with a rear assembly formed of a floor plate construction generally designated 4' which is made up of a combination passenger compartment floor plate portion 4'' and rear trunk space separating wall portion 21'. A separate floor plate 4''' forms the bottom of a trunk space 9'. The floor plate 4'' includes an upwardly curved separating wall portion 21' formed as a continuation of a passenger compartment wall portion 40 and integrally formed therewith. The rear trunk wall portion 4''' includes a flange portion which is spot welded as at 25 to the upwardly curved portion 21' at the lower end thereof at the location where the frame of the vehicle extends upwardly over the rear axle. The upper end of the curved upper part 21' is provided with flange 42 which is spot welded at 23 to a shelf plate 8' which closes the top of the trunk space 9' in respect to the passenger compartment 27'. The rear frame 3' (FIG. 11) is spot welded to the floor plate 4' to form the floor assembly 5'. The inner tire housing 11' and the outer tire housing 11' are seam welded to the flange portions 11a' and 12a' and the bracket 16' for mounting the fuel tank is welded to the bracket 19. Brackets or flanges 17 are welded to the rear pillar 13' and the outer board 14' is spot welded to the tire housings 11' and 12' to form the side frame assembly 15.

A feature of the construction of the invention is that the trunk floor plate 4''' is provided with one or more through openings or holes 28 (in this case a hole 28 on each side of the center of the floor plate 4''') in order to provide means for draining the fuel out of the trunk space 9' in the event that fuel forms therein for any reason whatsoever, such as for example, the rupture of the fuel tank 2'.

The flange portions 21a' of the backing plate portion 21' and the flange 17a' of the bracket 17' are spot welded at the location 29 on the main assembly line. The flange 4a' of the passenger compartment floor plate 4" and the lower edge 11b' of the inner tire housing 11' are spot welded at the location 30. The flange 21a' of the backing plate portion 21' and the side portion of the inner tire housing 11' are spot welded at the location 31, and the bracket 17' and the rear shelf plate 8' are spot welded at the location 32. The bracket 19' of the fuel tank 2' is integrally connected with the bracket 16' of the inner tire housing 11' so that the fuel tank 2' is disposed immediately above the openings 28 of the trunk space 9'. A packing 33 of a flexible material such as sponge rubber provides a sealing connection between the floor plate 4'" of the trunk space and the fuel tank 2' at the outer periphery of the openings 28.

With the arrangement of the invention, the flanges 21a' of the backing plate portion 21' and the bracket flange 17a' are exposed rearwardly. The flange 4a' of the floor plate of the passenger compartment 4" and the lower edge 11b' of the inner tire housing are exposed downwardly. The rear edges of the bracket 17' and the rear shelf plate 8' are exploded rearwardly when the floor self assembly 5' and the side frame self assembly 15' are integrally bonded on the main assembly line. The spot welding at the portions 29, 30, and 31 may be readily done.

Figure 12:
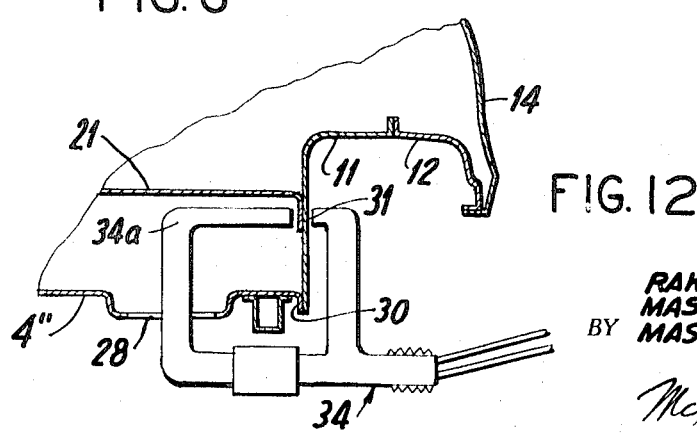
FIG. 12 is a partial sectional view taken along the lines XII—XII of FIG. 10, showing the manner in which spot welding may be done very easily.

Since one supporting arm 34a as shown in FIG. 12 of the spot welder generally designated 34 can be inserted through the opening 28 of the floor plate portion 4'" of the trunk space 9' when the side portion of the inner tire housing 11' and the flange 21a' of the backing plate 21' are to be bonded to each other this operation may be simply done.

Figure 13:
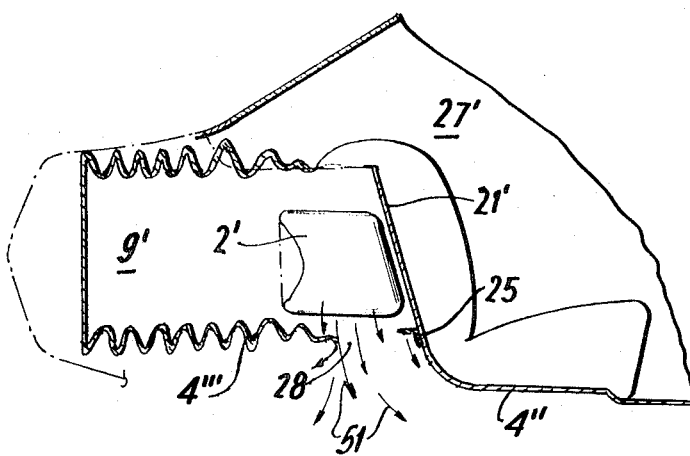
FIG. 13 is a partial longitudinal sectional view of the rear portion of the vehicle constructed in accordance with the invention showing the manner in which the rear end collision would affect the structural parts.

A further feature of the inventive construction is that there is considerably less damage to the rear wall 21' when the vehicle is in a rear end collision and deformed as shown schematically in FIG. 13. When the fuel tank 2' is damaged by a vehicle collision sufficiently to cause the fuel leak out of the tank, it will move as indicated by arrows 50 through the openings 28 and be discharged on the street. The packing 33 may become separated by the fuel nevertheless tend to fall directly through the openings 28. Thus, even if the spot welded portion 25 between the trunk space floor plate portion 4'" and the wall portion 21' should be ruptured, there will be no breaking of the seal formed by the wall portion 21' and the floor plate portion 4". Separation of the floor plate 4'" from the floor plate 4" will only cause an opening which extends into the street so that more fuel can spill out into the street rather than to be trapped in any space within the interior. Because the curved plate portion 21' is an integral part of the plate 4" the structure is very strong and the communication between the trunk space 9' and the passenger compartment 27 will not be likely to take place. In addition, with the construction of the invention the tire housings 11' and 12' may be seam welded so that no dirt or water can enter into the véhicle body. Compared for example to the conventional vehicle body shown in FIG. 7, the present invention has only a few parts which require interconnection and welding. This means that the production costs are vastly less expensive and may be easily accomplished.

What is claimed is:

1. A vehicle rear body construction, comprising a passenger compartment floor plate having a generally horizontal passenger floor portion and an upwardly extending rear portion forming a passenger compartment wall, a rear compartment floor plate joined to said passenger compartment floor plate adjacent the bottom of said upwardly extending rear portion and extending rearwardly to define the rear compartment floor, and an inner and outer tire housing assembly spot welded to both sides of said floor plate at said compartment wall portion and said passenger floor portion.

2. A vehicle rear body construction, according to claim 1, including means on said rear compartment floor for mounting a gas tank, and an opening through said floor at the location of said mounting means.

3. A vehicle rear body construction, according to claim 1, wherein said rear compartment floor includes a flange portion shaped similar to the lower portion of said compartment wall and being welded to said compartment wall.

4. A vehicle rear body construction, according to claim 1, including a shelf plate extending substantially horizontally rearwardly of the upper end of said passenger compartment wall portion and being welded thereto.

5. A vehicle rear body construction, according to claim 1, wherein said inner and outer tire housing assemblies comprise an inner housing having a downwardly extending portion and an outwardly extending portion said outwardly extending portion terminating in a peripheral flange, said outer tire housing including an inner wall having a flange which is welded to the flange of said inner tire housing.

6. A vehicle rear body construction, according to claim 5, including a bracket carried on said inner tire housing for supporting a fuel tank and a fuel tank located in said rear compartment over said floor plate and connected to said bracket.

7. A vehicle rear body construction, comprising a passenger compartment floor plate having a generally horizontally extending passenger floor plate portion and an upwardly extending rear portion forming a passenger compartment wall, a rear compartment floor plate joined to said passenger compartment floor plate adjacent the bottom of said upwardly extending rear portion, said rear compartment floor plate extending substantially horizontally rearwardly to define a rear compartment floor, said rear compartment floor having at least one opening therethrough, and a gas tank mounted in said rear compartment adjacent said passenger compartment wall and located so that any fuel issuing therefrom due to leakage or rupture will move through the opening of said floor.

8. A vehicle rear body construction, according to claim 7, including means for mounting said fuel tank in said compartment above said wall and providing packing therefore.

9. A vehicle rear body construction, according to claim 7, wherein said rear compartment floor extends into a trunk space, said floor having an opening therein adjacent to said rear compartment wall.

10. A vehicle rear body construction, according to claim 9, wherein there are two openings on each side of said rear compartment floor.

11. A vehicle rear body construction for a vehicle having a rear cross axle for supporting two rear wheels, comprising a passenger compartment floor plate having a generally horizontally extending passenger floor plate portion, and having an upwardly extending rear portion adjacent the rear axle and forming a rear passenger compartment wall, a rear trunk compartment floor plate having an upwardly offset portion terminating in a flange extending along the end which is joined to said passenger compartment floor plate at a location below the top of said upwardly extending portion, a fuel tank mounted on said offset portion of said rear compartment floor plate, said rear compartment compartment floor plate having at least one opening therethrough for the passage of fuel from the fuel tank directly to the exterior of the vehicle, and an inner and outer tire housing assembly spot welded to both sides of said floor plate at said compartment and at said passenger floor portion.

12. A vehicle, according to claim 11, including a rear shelf welded to the upper end of said upwardly extending portion of said passenger compartment floor plate.

* * * * *